Nov. 1, 1938.  W. C. HEDGCOCK  2,134,943
BRAKE ARRANGEMENT
Filed March 11, 1937  2 Sheets-Sheet 1
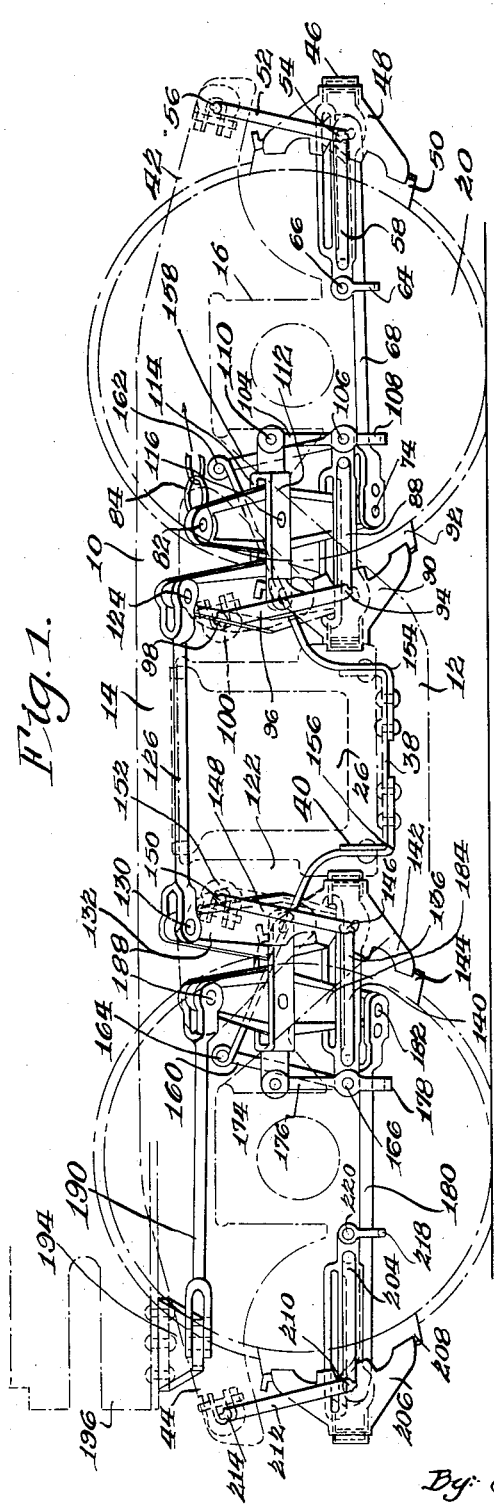
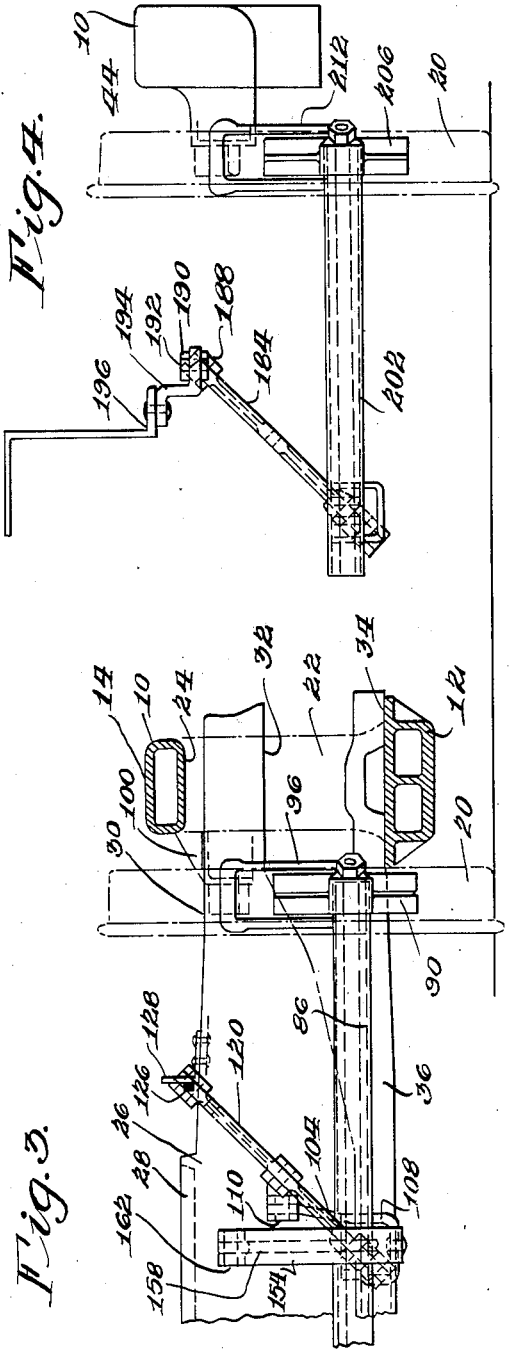
Inventor:—
William C. Hedgcock
By Wilkinson, Huxley, Byron and Knight
attys.

Nov. 1, 1938.   W. C. HEDGCOCK   2,134,943
BRAKE ARRANGEMENT
Filed March 11, 1937   2 Sheets-Sheet 2

Inventor:
William C. Hedgcock
By Wilkinson,
Huxley, Byron
and Knight
Attys.

Patented Nov. 1, 1938

2,134,943

UNITED STATES PATENT OFFICE 2,134,943

BRAKE ARRANGEMENT

William C. Hedgcock, Wilmette, Ill., assignor to American Steel Foundries, Chicago, Ill., a corporation of New Jersey Application March 11, 1937, Serial No. 130,366

27 Claims. (Cl. 188—56)

This invention pertains to a brake arrangement, and more particularly to clasp brakes for four-wheel freight car trucks.

It is an object of this invention to provide a clasp brake arrangement having a brake beam interchangeable with the standard truss type freight car beam whereby a car equipped with this brake arrangement is acceptable in interchange service.

Another object is to provide a brake arrangement for cars having restricted clearances such as between the slope sheets and trucks of hopper cars.

Still another object is to provide a brake arrangement wherein the weight of the parts is kept at a minimum, and the rigging is inexpensive to make and maintain and fulfills all requirements of manufacture and service.

Yet another object is to provide a brake arrangement wherein the beam is effectively balanced to prevent dragging of the top of the shoes on the wheel.

A different object is to provide a brake arrangement wherein no brake forces are disposed to act upon the bolster or load carrying member.

A still different object is to provide a brake arrangement preserving maximum clearances, the same being so arranged that no part of the brake is above the brake beam at the one end, such as the inside end, of the truck.

A yet different object is to provide a truck and brake construction wherein the weight and number of parts carried by certain of the brake beams, such as the outer ones, is kept at a minimum as the effect of vibration is very severe on the hanging and balancing means, particularly of the outside brake beams.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a side elevation of a four-wheel railway car truck having a brake arrangement embodying the invention applied thereto;

Figure 3 is a fragmentary transverse sectional elevation taken substantially at the transverse center of the truck;

Figure 4 is a fragmentary transverse end elevation of the truck and brake arrangement, the same looking toward the right as viewed in Figure 1.

Figure 2:
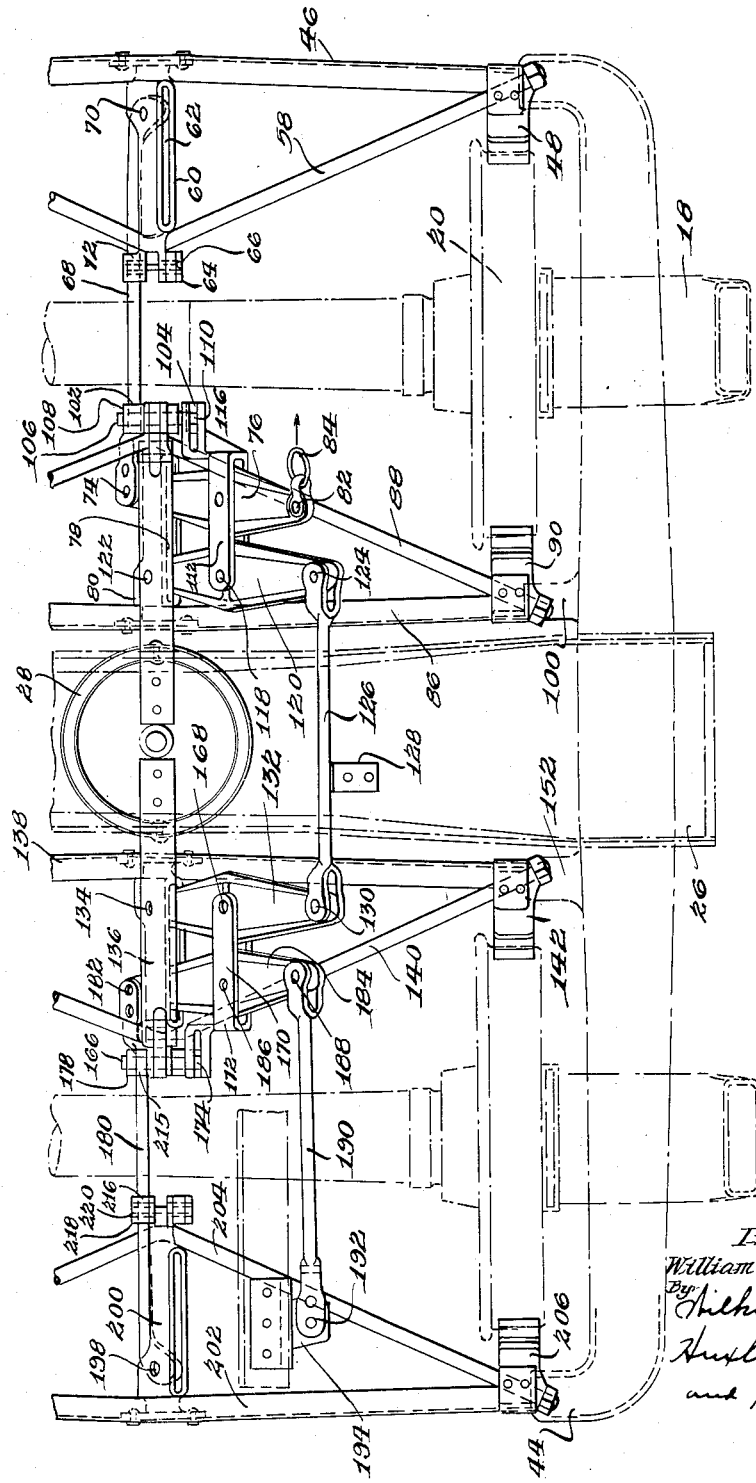
Figure 2 is a fragmentary top plan view of the car truck and brake arrangement illustrated in Figure 1.

Inasmuch as both sides of the brake arrangement are substantially the same, and the same operating means is used for each side of the truck, only one side of said brake arrangement is shown and described.

In the car truck illustrated, which is of the four-wheel type, the side frame 10 is substantially of truss construction including the tension member 12, compression member 14 connected adjacent the ends thereof and provided with spaced pedestals 16 for reception of journal means 18 of the spaced wheel and axle assemblies 20. Spaced columns 22 integrally connect the tension and compression members and provide the substantially centrally disposed window 24, said window being adapted to receive the ends of the transversely disposed load carrying member, which, in the construction illustrated, comprises the bolster 26. Said bolster is provided with the centrally disposed center bearing 28, suitable side bearings 30, and end spring seats 32 whereby the bolster may be supported on the spring seat 34 provided in the window through suitable resilient means (not shown). The spaced side frames are connected by the transversely extending spring plank 36 which, in the construction shown, is substantially channel-shaped provided with the web portion 38 and the spaced upwardly extending flanges 40, the ends of said spring plank being seated on the spring seat 34 of said side frames in the window 24.

The ends of the truck frame 10 are provided with inwardly and downwardly sloping brackets 42 and 44 and at the inner end of said truck a brake beam 46 is provided with the brake head 48 having a suitable shoe 50 thereon adapted for braking cooperation with the outer periphery of the inner wheel. Brake beam 46 is supported by means of the brake hanger 52 pivoted to said brake beam at 54 and said hanger is pivoted adjacent the upper end thereof as at 56 to the bracket 42. The brake beam 46 is interchangeable with the standard truss type of beam and said brake beam is provided with the tension member 58 and the fulcrum 60, said fulcrum having the elongated slot 62 and a clevis 64 pivoted to said fulcrum as at 66 and forming a safety means for the pull rod 68.

The pull rod 68 is pivoted as at 70 to the brake beam fulcrum 60 within the slot 62 and functions as a balancing means for the brake beam. The brake beam fulcrum is provided with bosses 72, one of which is supportingly engaged by the pull rod 68. The other end of the pull rod 68 is adjustably pivoted as at 74 to the lower end of the lever 76 which lever extends through the elongated slot 78 of the fulcrum 80, the upper end of said truck lever being pivotally connected as at 82 to operating means 84, such as brake cylinder means supported on the car body.

The fulcrum 80 is disposed between the compression member of the brake beam 86 and the tension member 88 thereof, said brake beam being provided with the brake head 90 having a suitable shoe 92 adapted for braking cooperation with the inner periphery of the adjacent inner wheel. The brake beam is pivotally connected as at 94 to the brake hanger 96, said brake hanger being pivotally supported as at 98 to the bracket 100 provided on the side frame. As before the fulcrum 80 is provided with the bosses 102 which are supportingly engaged by the pull rod 68 and to the outer end of said fulcrum. A supporting hanger 104 is pivoted as at 106 to the fulcrum, said supporting hanger being provided with a loop or clevis-like portion 108 extending below the pull rod 68 and forming safety means therefor. The upper end of the supporting hanger 104 is pivotally connected as at 110 to one end of a connection or strap 112. The strap 112 is provided with the jaw 114, said jaw being pivoted as at 116 to the truck lever 76 and as at 118 to the truck lever 120. The truck lever 120 is pivotally connected adjacent the lower end thereof as at 122 to the fulcrum 80 and is pivotally connected adjacent the upper end thereof, as at 124, to the pull rod 126.

The pull rod 126 is disposed above and extends across the bolster, and a suitable guide bracket 128 thereon prevents sagging of the rigging. The opposite end of the pull rod is pivotally connected as at 130 to the upper end of the truck lever 132, said truck lever extending angularly downwardly and is pivotally connected adjacent the lower end thereof as at 134 to the fulcrum 136 of the brake beam 138. The brake beam 138 is likewise of truss shape including the tension member 140 and the outer end of the brake beam has the brake head 142 with a suitable brake shoe 144 adapted for braking cooperation of the inner periphery of the adjacent wheel of the outer wheel and axle assembly.

The brake beam 138 is pivotally connected as at 146 to the brake hanger 148, said brake hanger being pivotally connected as at 150 to the inwardly extending bracket 152 on the side frame. Third point supports or balance hanger brackets 154 and 156 are mounted on the spring plank 36 and extend upwardly and outwardly toward the respective ends of the truck. Balance hangers 158 and 160 are pivotally connected as at 162 and 164 to said brackets and are pivotally connected adjacent the lower ends thereof as at 106 and 166 to the brake beam fulcrums 80 and 136.

The truck lever 132 is pivotally connected intermediate the ends thereof as at 168 to the jaw 170 of the connecting means 172, said connecting means 172 being pivotally connected as at 174 to the hanger 176, said hanger extending downwardly and being pivotally connected as at 166 to the fulcrum 136 and having the looped or clevis portion 178 extending below and forming safety means for the pull rod 180. The inner end of the pull rod 180 is pivotally and adjustably connected as at 182 to the lower end of the truck lever 184, said truck lever extending freely through the slot in the fulcrum 136 and being pivotally connected as at 186 to the jaw 170. The upper end of the truck lever 184 is pivotally connected as at 188 to one end of the pull rod 190, the opposite end of said pull rod being pivotally and adjustably connected as at 192 to the bracket 194 secured on the center or draft sills 196 of the adjacent car body.

The outer end of the pull rod 180 is pivotally connected as at 198 to the fulcrum 200, said fulcrum having an elongated slot therein and forming a connection between the compression member of the outer brake beam 202 and the tension member 204 thereof. The brake beam 202 carries the brake head 206 having a suitable shoe 208 thereon adapted for braking cooperation with the outer periphery of the adjacent wheel. The brake beam 202 is pivotally connected as at 210 to the hanger 212, the upper end of the hanger being connected as at 214 to the bracket 44. The fulcrums 136 and 200 have the respective bosses 215 and 216, one of each of which is supportingly engaged by the pull rod 180. A clevis 218 is pivotally connected as at 220 to the fulcrum 200 and forms safety means for the pull rod 180.

In the construction shown, paired levers 120 and 76, and 132 and 184 are so disposed that the levers 76 and 184 pass freely through and operate in the slots in the adjacent fulcrums 80 and 136 and are positioned with the long arm of the levers at the bottom so that the jaw of the pull rods 68 and 180 will satisfactorily clear the fulcrums of the inside brake beams. Truck levers 120 and 132 have the long arms of the levers at the top. The brake arrangement thus formed prevents braking force from acting upon the truck bolster, as the bolster is merely a support for the rod 126. Further, at the inside of the truck no part of the brake is above the brake beam so that ample clearance is provided with this type of braking for slope sheets on hopper cars or other car body features.

In the operation of this form of brake, assuming the brake arrangement to be in released position, the upper end of the truck lever 76 is moved toward the right, as viewed in Figures 1 and 2, causing a clockwise movement of said truck lever about the pivot 116. This movement of the lever causes the pull rod 68 to be moved toward the left as viewed in said figures, applying the brake shoe 50 to the outer periphery of the adjacent inner wheel. Continued movement of the truck lever 76 causes bodily movement of said lever toward the right as viewed in said figures, moving the truck lever 120 therewith. Movement of the truck lever 120 toward the right causes pivotal movement of the said truck lever about the pivot 124, thus moving the brake shoe 92 toward the right for braking engagement with the inner periphery of the adjacent inner wheel.

Continued movement causes the pull rod 26 to move the upper end of the lever 132 toward the right, causing said lever to have a pivotal movement about the pivot 168, causing the brake shoe 144 to have braking engagement with the inner periphery of the adjacent outer wheel. Continued movement of the brake arrangement causes bodily movement of the strap 172 causing the lever 184 to pivot about the point 188, thereupon moving the pull rod 180 toward the right as viewed in Figure 1, thus moving the brake shoe 208 to bring it into engagement with the outer periphery of the outer wheel. Release of the brake arrangement is of course effected in an opposite direction.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

What is claimed is:—

1. In a brake arrangement, the combination of a truck frame having a load carrying member, a car body supported on said load carrying member, spaced wheel and axle assemblies supporting said truck frame, brake beams disposed at opposite sides of each of said wheel and axle assemblies, connecting means between the opposite brake beams of one wheel and axle assembly, said means including a pull rod pivoted to one of said last named brake beams, a truck lever pivoted to said pull rod and to said car body and carried by said brake beam, a second truck lever pivoted to said first truck lever and to the adjacent brake beam, connecting means between the opposite brake beams of another wheel and axle assembly, said second named means including a pull rod pivotally connected to one of said brake beams of said last named wheel and axle assembly, a truck lever pivoted to said last named pull rod and to brake operating means and carried by said brake beam of said last-named wheel and axle assembly, a truck lever pivoted to said last named truck lever and to another brake beam of said last named wheel and axle assembly, and a connection between said second and third named truck levers, said connection extending above said load carrying member.

2. In a brake arrangement, the combination of a truck frame having a load carrying member, a car body supported on said load carrying member, spaced wheel and axle assemblies supporting said truck frame, brake beams disposed at opposite sides of each of said wheel and axle assemblies, connecting means between the opposite brake beams of one wheel and axle assembly, said means including a pull rod pivoted to one of said last named brake beams, a truck lever pivoted to said pull rod and to said car body, a second truck lever pivoted to said first truck lever and to the adjacent brake beam, connecting means between said levers and said adjacent brake beam, connecting means between the opposite brake beams of another wheel and axle assembly, said second named means including a pull rod pivotally connected to one of said brake beams of said last named wheel and axle assembly, a truck lever pivoted to said last named pull rod and to brake operating means, a truck lever pivoted to said last named truck lever and to another brake beam of said last named wheel and axle assembly, a connection between said last-named levers and said another brake beam of said last-named wheel and axle assembly, and a connection between said second and third named truck levers.

3. In a brake arrangement, the combination of a truck frame having a load carrying member, a car body supported on said load carrying member, spaced wheel and axle assemblies supporting said truck frame, brake beams disposed at opposite sides of each of said wheel and axle assemblies, connecting means between the opposite brake beams of one wheel and axle assembly, said means including a pull rod pivoted to one of said last named brake beams, a dead truck lever pivoted to said pull rod, a second truck lever pivoted to said first truck lever and to the adjacent brake beam, connecting means between said levers and said adjacent brake beam, connecting means between the opposite brake beams of another wheel and axle assembly, said second named means including a pull rod pivotally connected to one of said brake beams of said last named wheel and axle assembly, a truck lever pivoted to said last named pull rod and to brake operating means, a truck lever pivoted to said last named truck lever and to another brake beam of said last named wheel and axle assembly, a connection between said last-named levers and said another brake beam of said last-named wheel and axle assembly, a connection between said second and third named truck levers, said connection extending above said load carrying member, and balance hangers secured to said truck frame and connected to said brake beams at the connections between said levers and said brake beams.

4. In a brake arrangement, the combination of a truck frame having a load carrying member, a car body supported on said load carrying member, spaced wheel and axle assemblies supporting said truck frame, brake beams disposed at opposite sides of each of said wheel and axle assemblies, connecting means between the opposite brake beams of one wheel and axle assembly, said means including a pull rod pivoted to one of said last named brake beams, a dead truck lever pivoted to said pull rod, means for carrying said lever on said brake beam, a second truck lever pivoted to said first truck lever and to the adjacent brake beam, said carrying means connecting said levers to said brake beam, connecting means between the opposite brake beams of another wheel and axle assembly, said second named means including a pull rod pivotally connected to one of said brake beams of said last named wheel and axle assembly, a truck lever pivoted to said last named pull rod and to brake operating means, means for carrying said last-named lever on said one of said brake beams of said last-named wheel and axle assembly, said last-named carrying means connecting said last-named levers to said last-named brake beam, a truck lever pivoted to said last named truck lever and to another brake beam of said last named wheel and axle assembly, and a connection between said second and third named truck levers.

5. In a brake arrangement, the combination of a wheel, brake beams disposed on opposite sides of said wheel, each of said beams having a slotted fulcrum, brake shoes on each of said beams and disposed in the plane of said wheel, a pair of brake levers disposed on one side of said wheel and pivotally connected intermediate the ends thereof, one of said levers being a dead lever extending through the slot of the adjacent fulcrum, a pull rod connected through a single pivotal connection to the other fulcrum and pivotally connected to said dead lever below the fulcrum, the other of said levers being pivotally connected to said adjacent fulcrum, and operating means connected to said last named lever adjacent the upper end thereof.

6. In a brake arrangement, the combination of a wheel, brake beams disposed on opposite sides of said wheel, each of said beams having a slotted fulcrum, brake shoes on each of said beams and disposed in the plane of said wheel, a pair of brake levers disposed on one side of said wheel and pivotally connected intermediate the ends thereof, one of said levers being a dead lever extending through the slot of the adjacent fulcrum, a pull rod connected through a single pivotal connection to the other fulcrum and pivotally connected to said dead lever below the fulcrum, the other of said levers being pivotally connected to said adjacent fulcrum, each of said fulcrums being supportingly engaged by said pull rod, and operating means connected to said last named lever adjacent the upper end thereof.

7. In a brake arrangement, the combination of a wheel, brake beams of truss construction disposed on opposite sides of said wheel and having tension members, brake shoes on each of said beams and disposed in the plane of said wheel, a brake lever carried by one of said brake beams, a pull rod connected through a single pivotal connection to the other of said brake beams in spaced relation to the tension member thereof and pivotally connected to said brake lever and providing a support of said brake beam adjacent the tension member thereof, and operating means connected to said brake lever.

8. In a brake arrangement, the combination of a wheel, brake beams disposed on opposite sides of said wheel, each of said beams having a fulcrum, one of said fulcrums being slotted, a pull rod connected to the other of said fulcrums by a single pivotal connection, said pull rod extending below the wheel center and below said slotted fulcrum, a brake lever extending through the slot of said slotted fulcrums and being pivotally connected to said pull rod, and means connected to said slotted fulcrum and to said brake lever and serving as a safety support for said brake lever.

9. In a brake arrangement, the combination of a wheel, inner and outer brake beams disposed on opposite sides of said wheel, brake shoes provided on said brake beams and disposed in the plane of said wheel and adapted for braking cooperation with said wheel, a brake hanger pivotally supporting said outer brake beam, said outer brake beam being provided with a fulcrum, a pull rod connected to said fulcrum by a single pivotal connection and supportingly engaging said fulcrum, a slotted fulcrum provided on said inner brake beam, a dead brake lever extending through said slot and being pivotally connected to said pull rod, a live brake lever pivotally connected to said slotted fulcrum in said slot, a connection between said live and dead brake levers, and operating means connected to the other end of said live brake lever.

10. In a brake arrangement, the combination of a wheel, inner and outer brake beams disposed on opposite sides of said wheel, brake shoes provided on said brake beams and disposed in the plane of said wheel and adapted for braking cooperation with said wheel, a brake hanger pivotally supporting said outer brake beam, said outer brake beam being provided with a fulcrum, a pull rod connected to said fulcrum by a single pivotal connection and supportingly engaging said fulcrum, a slotted fulcrum provided on said inner brake beam, a dead brake lever extending through said slot and being pivotally connected to said pull rod, a live brake lever pivotally connected to said slotted fulcrum in said slot, a connection between said live and dead brake levers, operating means connected to the other end of said live brake lever, and connecting means between said slotted fulcrum and said connection.

11. In a brake arrangement, the combination of a wheel, inner and outer brake beams disposed on opposite sides of said wheel, brake shoes provided on said brake beams and disposed in the plane of said wheel and adapted for braking cooperation with said wheel, a brake hanger pivotally supporting said outer brake beam, said outer brake beam being provided with a fulcrum, a pull rod connected to said fulcrum by a single pivotal connection and supportingly engaging said fulcrum, a slotted fulcrum provided on said inner brake beam, a dead brake lever extending through said slot and being pivotally connected to said pull rod, a live brake lever pivotally connected to said slotted fulcrum in said slot, a connection between said live and dead brake levers, operating means connected to the other end of said live brake lever, and connecting means between said slotted fulcrum and said connection, said connecting means having a portion underlying said pull rod.

12. In a brake arrangement, the combination of a wheel, inner and outer brake beams disposed on opposite sides of said wheel, brake shoes provided on said brake beams and disposed in the plane of said wheel and adapted for braking cooperation with said wheel, a brake hanger pivotally supporting said outer brake beam, said outer brake beam being provided with a fulcrum, a pull rod connected to said fulcrum by a single pivotal connection and supportingly engaging said fulcrum, a slotted fulcrum provided on said inner brake beam, a dead brake lever extending through said slot and being pivotally connected to said pull rod, a live brake lever pivotally connected to said slotted fulcrum in said slot, a connection between said live and dead brake levers, operating means connected to the other end of said live brake lever, connecting means between said slotted fulcrum and said connection, said connecting means having a portion underlying said pull rod, and a balance hanger pivotally supported adjacent said inner brake beam and pivotally connected to said slotted fulcrum.

13. In a brake arrangement, the combination of a wheel, a truck frame supported by said wheel, a brake beam disposed adjacent said wheel and provided with a brake shoe disposed in the plane of said wheel and adapted for braking cooperation therewith, said brake beam being provided with a slotted fulcrum, a dead truck lever extending through said slot and pivotally connected to means connected to said truck frame, a live truck lever pivotally connected to said fulcrum and to said dead truck lever, and operating means connected to said live truck lever.

14. In a brake arrangement, the combination of a wheel, a truck frame supported by said wheel, a brake beam disposed adjacent said wheel and provided with a brake shoe disposed in the plane of said wheel and adapted for braking cooperation therewith, said brake beam being provided with a slotted fulcrum, a dead truck lever extending through said slot and pivotally connected to means connected to said truck frame, a live truck lever pivotally connected to said fulcrum and to said dead truck lever, and operating means connected to said live truck lever, the connection between said live and dead truck levers being provided with means pivotally connected to said brake beam.

15. In a brake arrangement, the combination of a wheel, a truck frame supported by said wheel, a brake beam disposed adjacent said wheel and provided with a brake shoe disposed in the plane of said wheel and adapted for braking cooperation therewith, said brake beam being provided with a slotted fulcrum, a dead truck lever extending through said slot and pivotally connected to means connected to said truck frame, a live truck lever pivotally connected to said fulcrum and to said dead truck lever, operating means connected to said live truck lever, the connection between said live and dead truck levers being provided with means pivotally connected to said brake beam, and a balance hanger pivotally supported by said truck frame and pivotally connected to said fulcrum at the connection between said fulcrum and said last named means.

16. In a brake arrangement, the combination of a wheel, a truck frame supported by said wheel, a brake beam disposed on each side of said wheel and being provided with brake shoes disposed in the plane of the wheel and adapted for braking cooperation therewith, one of said brake beams being provided with a slotted fulcrum, a truck lever extending through said slot and operatively connected to the other of said brake beams, a truck lever connected to said fulcrum and to said first-named truck lever, operating means connected to one of said levers, and means connected to the other of said levers whereby said operating means is effective in moving said brake shoes into and out of said braking cooperation with said wheel.

17. In a brake arrangement, the combination of a wheel, a truck frame supported by said wheel, a brake beam disposed on each side of said wheel and being provided with brake shoes disposed in the plane of the wheel and adapted for braking cooperation therewith, one of said brake beams being provided with a slotted fulcrum, a truck lever extending through said slot and operatively connected to the other of said brake beams, a truck lever connected to said fulcrum and to said first-named truck lever, operating means connected to one of said levers, means connected to the other of said levers whereby said operating means is effective in moving said brake shoes into and out of said braking cooperation with said wheel, and means providing a connection between the connection for said levers and said brake beam provided with said slotted fulcrum.

18. In a brake arrangement, the combination of a wheel, a truck frame supported by said wheel, a brake beam disposed on each side of said wheel and being provided with brake shoes disposed in the plane of the wheel and adapted for braking cooperation therewith, one of said brake beams being provided with a slotted fulcrum, a truck lever extending through said slot and operatively connected to the other of said brake beams, a truck lever connected to said fulcrum and to said first-named truck lever, operating means connected to one of said levers, means connected to the other of said levers whereby said operating means is effective in moving said brake shoes into and out of said braking cooperation with said wheel, means providing a connection between the connection for said levers and said brake beam provided with said slotted fulcrum, and a balance hanger provided on said truck frame and connected to said slotted fulcrum.

19. In a brake arrangement, the combination of a wheel, a truck frame supported by said wheel, a brake beam disposed adjacent said wheel and provided with a brake shoe disposed in the plane of said wheel and adapted for braking cooperation therewith, said brake beam being provided with a slotted fulcrum, a truck lever extending through said slot and connected to means connected to said truck frame, a truck lever pivotally connected to said fulcrum and to said first-named lever, operating means connected to one of said truck levers, and means connected to the other of said levers whereby said operating means is effective in moving said brake shoe into and out of said braking cooperation with said wheel.

20. In a brake arrangement, the combination of a wheel, a truck frame supported by said wheel, a brake beam disposed adjacent said wheel and provided with a brake shoe disposed in the plane of said wheel and adapted for braking cooperation therewith, said brake beam being provided with a slotted fulcrum, a truck lever extending through said slot and connected to means connected to said truck frame, a truck lever pivotally connected to said fulcrum and to said first-named lever, operating means connected to one of said truck levers, means connected to the other of said levers whereby said operating means is effective in moving said brake shoe into and out of said braking cooperation with said wheel, and means providing a connection between the connection for said levers and said brake beam.

21. In a brake arrangement, the combination of a wheel, a truck frame supported by said wheel, a brake beam disposed adjacent said wheel and provided with a brake shoe disposed in the plane of said wheel and adapted for braking cooperation therewith, said brake beam being provided with a slotted fulcrum, a truck lever extending through said slot and connected to means connected to said truck frame, a truck lever pivotally connected to said fulcrum and to said first-named lever, operating means connected to one of said truck levers, means connected to the other of said levers whereby said operating means is effective in moving said brake shoe into and out of said braking cooperation with said wheel, means providing a connection between the connection for said levers and said brake beam, and a balance hanger provided on said truck frame and connected to said fulcrum.

22. In a brake arrangement, the combination of a wheel, brake beams disposed on opposite sides of said wheel, brake shoes on each of said beams and disposed in the plane of said wheel, a brake lever carried by one of said brake beams, a pull rod connected through a single pivotal connection to the other of said brake beams and pivotally connected to said brake lever, operating means connected to said brake lever, and means including a lever connected to said first-named brake beam and to said operating means whereby said first-named brake beam is operated.

23. In a brake arrangement, the combination of a wheel, a brake beam of truss construction having a tension member disposed on one side of said wheel and having a brake shoe supported thereon, a brake lever disposed on the opposite side of said wheel from said shoe, a pull rod pivoted to said brake beam in spaced relation to said tension member and supportingly engaging said brake beam adjacent said tension member, a pivotal connection between said pull rod and brake lever, and operating means connected to said lever.

24. In a brake arrangement, the combination of a wheel, a brake beam of truss construction having a tension member disposed on one side of said wheel and having a brake shoe supported thereon, a brake lever disposed on the opposite side of said wheel from said shoe, a pull rod pivoted to said brake beam in spaced relation to said tension member and supportingly engaging said brake beam adjacent said tension member, a pivotal connection between said pull rod and brake lever, and operating means connected to said lever intermediate the ends thereof.

25. In a brake arrangement, the combination of a wheel, a brake beam of truss construction having a tension member disposed on one side of said wheel and having a brake shoe supported thereon, a dead brake lever disposed on the opposite side of said wheel from said shoe, a pull rod pivoted to said brake beam in spaced relation to said tension member and supportingly engaging said brake beam adjacent said tension member, a pivotal connection between said pull rod and brake lever, and operating means connected to said lever.

26. In a brake arrangement, the combination of a wheel, a brake beam of truss construction having a tension member disposed on one side of said wheel and having a brake shoe supported thereon, a dead brake lever disposed on the opposite side of said wheel from said shoe, a pull rod pivoted to said brake beam in spaced relation to said tension member and supportingly engaging said brake beam adjacent said tension member, a pivotal connection between said pull rod and brake lever, and operating means connected to said lever intermediate the ends thereof.

27. In a brake arrangement, the combination of a wheel, brake beams of truss construction disposed on opposite sides of said wheel and having tension members, brake shoes on each of said beams and disposed in the plane of said wheel, a brake lever carried by one of said brake beams, a pull rod connected through a single pivotal connection to the other of said brake beams in spaced relation to the tension member thereof and pivotally connected to said brake lever, and operating means connected to said brake lever.

WILLIAM C. HEDGCOCK.